(12) United States Patent
Covington

(10) Patent No.: US 6,183,632 B1
(45) Date of Patent: Feb. 6, 2001

(54) ARRANGEMENT FOR FILTERING LIQUID USED IN A DEVICE HAVING A SUMP PAN

(75) Inventor: Edward Allen Covington, Gastonia, NC (US)

(73) Assignee: Dana Corporation, Toledo, OH (US)

( * ) Notice: Under 35 U.S.C. 154(b), the term of this patent shall be extended for 0 days.

(21) Appl. No.: 09/474,063

(22) Filed: Dec. 29, 1999

(51) Int. Cl.$^7$ .................................................. B01D 35/027
(52) U.S. Cl. ........................ 210/168; 210/172; 210/493.3
(58) Field of Search .................... 210/172, 168, 210/493.3; 184/6.24, 106; 123/196 A

(56) References Cited

U.S. PATENT DOCUMENTS

| | | | |
|---|---|---|---|
| 3,168,468 | * | 2/1965 | Jagdmann . |
| 4,352,737 | * | 10/1982 | Taniguchi . |
| 4,804,466 | | 2/1989 | Cooper et al. . |
| 4,995,971 | * | 2/1991 | Droste et al. . |
| 5,863,424 | * | 1/1999 | Lee . |
| 6,013,179 | * | 1/2000 | Laughlin et al. . |

FOREIGN PATENT DOCUMENTS 10-272312 * 10/1998 (JP) .

* cited by examiner

*Primary Examiner*—Thomas M. Lithgow
(74) *Attorney, Agent, or Firm*—Millen, White, Zelano & Branigan, P.C.

(57) ABSTRACT

An arrangement for filtering a liquid wherein the liquid accumulates in a sump pan includes a filter media, such as a pleated filter media which has a height approximating the height of the sump pan. Consequently, the filter media tends to interfere with the flow of filtered liquid towards a suction tube which returns the filtered liquid for recirculation. In order to facilitate flow of filtered liquid to the suction tube, the pan includes at least one shallow channel extending transverse to the pleats of the filter media. This arrangement with respect to vehicle transmission oil pans and vehicle lubrication oil pans.

13 Claims, 1 Drawing Sheet

ARRANGEMENT FOR FILTERING LIQUID USED IN A DEVICE HAVING A SUMP PAN

FIELD OF THE INVENTION

The present invention is directed to an arrangement for filtering liquid in a device having a sump pan. More particularly, the present invention is directed to an arrangement for filtering liquid in a device having a sump pan wherein the liquid passes through a filter media before being recirculated back through the device.

BACKGROUND OF THE INVENTION

In almost any type of modem machinery, it is desirable to advantageously use space by conserving space when possible. This is especially the case with vehicles. Exemplary of such a situation are vehicle transmissions and vehicle lubricating oil pans. Vehicle transmissions include an oil sump which fits under the valve body of the transmission. In certain cases, the pleat height of the filter may touch the bottom surface of the sump pan or be too close to the bottom surface of the pan to allow unrestricted flow of transmission oil to an oil collection location where an inlet tube withdraws filtered oil from the sump for recirculation in the transmission.

In vehicles, it is desirable to orient the panels of a pleated filter media so as to provide baffles which interrupt the flow within a sump pan away from the inlet tube so that the transmission is not intermittently starved when the vehicle is cornered or otherwise abruptly accelerated. This is accomplished by having filter media which extends in a direction which is perpendicular to or at least has a component which is perpendicular to the direction of the acceleration. In order to maximize the effectiveness of the filter media panels as baffles, it is preferable to have a filter media which is as high as possible within the sump pan, however this interferes with the ability of filtered oil to flow to the inlet tube for recirculation.

While these problems are of apparent significance with respect to transmissions and lubricating oil pans of vehicles, these problems also arise in other types of machinery in which liquids such as lubricating oils, hydraulic oils, fuels and coolant liquids are employed.

SUMMARY OF THE INVENTION

In view of the aforementioned considerations, it is a feature of the present invention to provide a new and improved arrangement for filtering liquids wherein liquids accumulate in a sump for recirculation.

In view of this feature and other features, the present invention is directed to an arrangement for filtering a liquid wherein the liquid accumulates in a sump pan after being used in a device wherein the sump pan has an opening through the top thereof and a closed bottom. A filter media, having a selected height with peaks and valleys, is disposed within the sump pan between the top and bottom of the sump pan wherein the liquid passes through the filter media before accumulating on the closed bottom of the sump pan. At least one shallow channel is formed in the closed bottom of the shallow pan and extends across the bottom to a collection location adapted to be aligned with the inlet tube of the device, whereby liquid flows to the location after passing through the media for recirculation by the device.

In further aspects of the invention, there is a well in the channel at the collection location and in still a further aspect of the invention, there are a plurality of channels.

Further aspects of the invention include utilizing a pleated filter media having panels extending across the bottom of the panel in a first direction and having channels which extend transversely with respect to the filter media in a selected direction.

In a more specific aspect of the invention, the arrangement is used in an oil sump of a vehicle for filtering oil, the sump being associated with a transmission or being associated with an oil pan for the lubrication system of an engine.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein.

DETAILED DESCRIPTION

Figure 1:
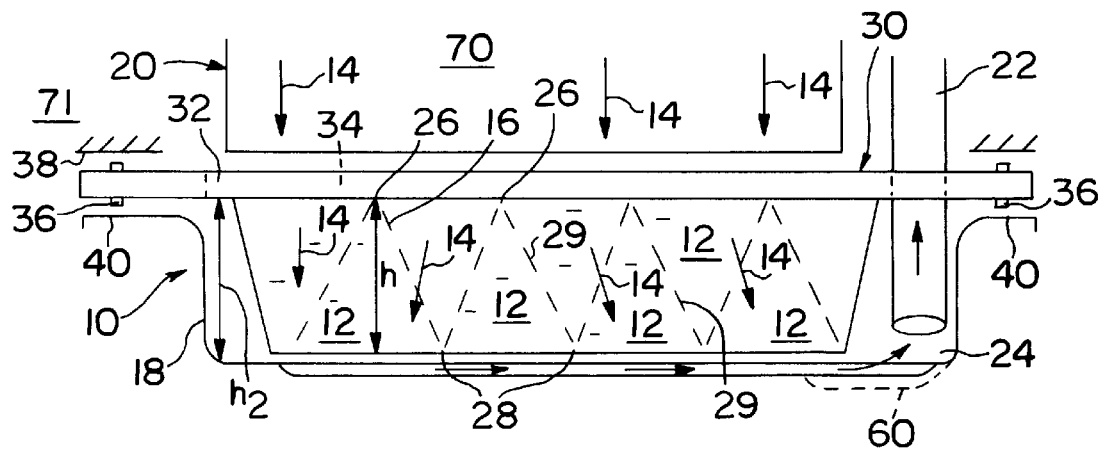
FIG. 1 is a rear view of a sump pan used in combination with a filter and valve body of a transmission in accordance with the present invention.

Referring now to FIG. 1, there is shown an arrangement 10 for filtering a liquid 12 flowing in the direction of arrows 14 through a filter media 16 disposed in a sump pan 18 of a device 20 disposed above the filter media and sump pan. The liquid 12 is returned to the device 20 by a tube 22 disposed adjacent a collection location 24. The collection location 24 is in communication with liquid 12' which has been filtered by the filter media 16.

The filter media 16 is preferably a pleated filter media having peaks 26 and 28 and having a selected height $H_1$. The selected height $H^1$ is approximately the same as the selected height $H_2$ of the sump pan 18. The filter media 16 is part of a filter element 30 which includes a peripheral flange 32 having a central opening 34. The peripheral flange 32 has a gasket 36 therearound which seals between a housing 38 and a peripheral flange 40 on the pan 18. Both the peripheral flange 40 and the peripheral flange 32 of the filter element 30 have bolt holes 42 and 44 therethrough which receive bolts that thread into threaded bolt holes 46 in the transmission case. Alternatively, the transmission case may have projecting, threaded studs which receive nuts in order to hold the flanges against the bottom surface 38 of the housing 39 which contains the device 20.

Figure 2:
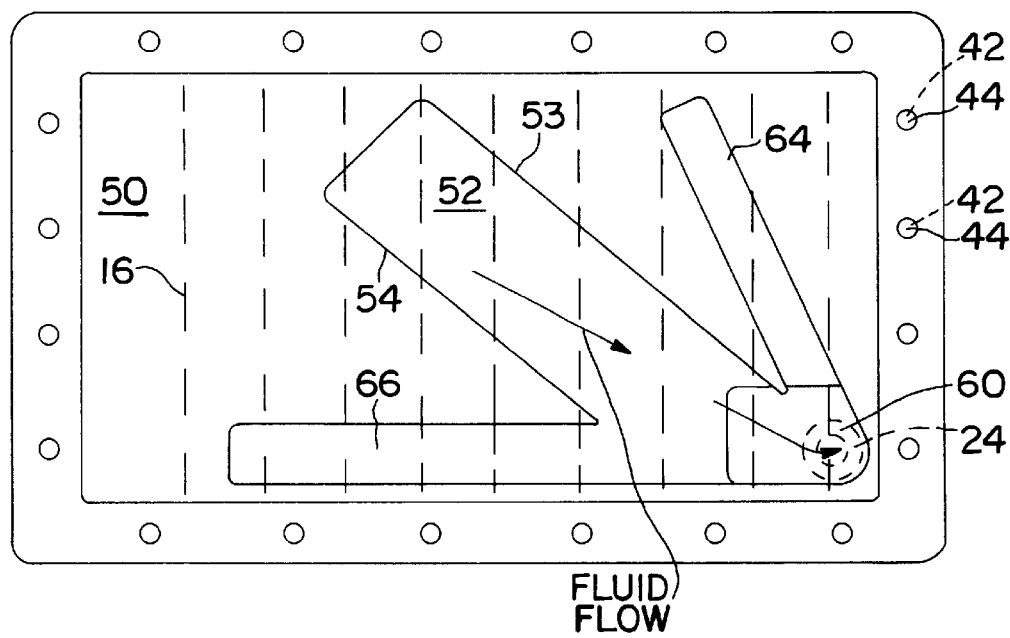
FIG. 2 is a top view of the sump pan of FIG. 1.

As is best seen in FIG. 2, the sump pan 18 has a bottom or floor 50 which has at least one shallow channel 52 therein which extends transverse to the direction of the panels 29 of pleated filter media 16. While the channel 52 is illustrated as having parallel sides 53 and 54, it is to be kept in mind that the channel 52 can have other shapes. The bottom of the channel 52 may be either flat or curvilinear or any shape which facilitates the purposes of the invention to allow flow of the filtered liquid 12' in a direction transverse to the panels 29 toward the collection location 24 which is within the channel 52. The collection location 24 may be in the form of a shallow well 60 to facilitate drainage toward the suction tube 22.

In addition to the channel 52, there may be other channels such as channels 64 and 66 which communicate with the location 24. In the illustrated embodiment, the channels 64 and 66 have a width less than the channel 52 and extend at acute angles with respect to a comer location of the collection location 24.

In a preferred embodiment of the invention, the device 20 is a valve body 70 of a vehicle transmission in which the valve body is aligned and opens directly to a sump pan 18 through the opening 34 in the peripheral flange 32 of filter 30. Accordingly, the liquid 12 is transmission oil flowing in the direction of arrows 14 so as to be filtered by a filter media 16 and to emerge from the filter media 16 as filtered transmission oil 12'. The filtered transmission oil 12' then flows along the channel 52 and the additional channels 60 and 62 toward the collection location 24 and is returned by the suction tube 22 to the transmission to which the valve body 70 is associated.

In the illustrated embodiment, the panels 29 of the filter media 16 extend in a direction parallel to vehicle motion so that when the vehicle upon which the filtering arrangement 10 is mounted corners, the transmission oil does not slosh to one side away from the collection location 24 and momentarily starve the transmission. By keeping the height of the channels 52, 60 and 62 relatively small, and by isolating the inlet tube 22 in the filtered liquid 12', movement of the filtered liquid away from the suction tube is minimal so as to not interfere with the flow of filtered liquid 12' to the transmission.

Periodically, the filter element 30 must be changed, and this is accomplished by unbolting the pan 18 and filter element 30 from the transmission case 71 so that the filter element 30 may be disposed of and replaced by a fresh filter element.

Since the gasket 36 is integral with the flange 32, resealing of the filter element 30 between the surfaces 38 and 40 of the transmission case 71 and sump pan 18 is accomplished upon bolting the flange 40 of the sump pan 18 back against the transmission case.

While a preferred embodiment of this invention is an arrangement for filtering transmission oil, the principles discussed herein are also applicable to filtering arrangements for lubricating oil used for a vehicle's engine, as well as coolant used in a vehicle. While the structure and principles shown herein are of interest to vehicular liquids, the structures and principles are also applicable to other filtering devices.

From the foregoing description, one skilled in the art can easily ascertain the essential characteristics of this invention and, without departing from the spirit and scope thereof, can make various changes and modifications of the invention to adapt it to various usages and conditions.

Upon further study of the specification and appended claims, further objects and advantages of this invention will become apparent to those skilled in the art.

What is claimed is:

1. An arrangement for filtering a liquid wherein the liquid accumulates in a sump pan after being used in a device, the sump pan having an opening through the top thereof and a closed bottom, the arrangement comprising:

a pleated filter media having a selected height with peaks and valleys, the filter media being disposed within the sump pan between the top and bottom of the sump pan wherein the liquid passes through the filter media before accumulating on the closed bottom of the sump pan;

at least one shallow channel in the closed bottom, the shallow channel extending transverse to the peaks and valleys across the bottom to a collection location adapted to be aligned with an inlet tube to the device, whereby liquid flows to the location after passing through the media for recirculation by the device.

2. The arrangement of claim 1 further including a well in the channel at the collection location.

3. The arrangement of claim 1 including additional channels extending across the bottom and in communication with the collection location.

4. The arrangement of claim 1 wherein there are a plurality of channels extending transversely with respect to the filter media.

5. The arrangement of claim 4 wherein the sump pan has a selected height and the selected height of the filter media approximates the selected height of the sump pan.

6. The arrangement of claim 5 wherein the opening through the top of the sump pan extends substantially over all of the filter media.

7. In an oil sump of a vehicle, an arrangement for filtering oil wherein the oil accumulates in a sump pan after being used in a device, the sump pan having an opening through the top thereof and a closed bottom, the arrangement comprising:

a pleated filter media having a selected height with peaks and valleys, the filter media being disposed within the sump pan between the top and bottom of the sump pan wherein the liquid passes through the filter media before accumulating on the closed bottom of the sump pan; the peaks and valleys of the pleated filter media having therebetween panels extending across the bottom of the sump pan in a direction substantially traverse to the direction of normal vehicle travel and at least one shallow channel in the closed bottom, the shallow channel extending across the bottom to a collection location adapted to be aligned with an inlet tube to the device, whereby liquid flows to the location after passing through the media for recirculation by the device.

8. The arrangement of claim 7 wherein there are a plurality of channels extending transversely with respect to the filter media.

9. The arrangement of claim 8 wherein the sump pan has a selected height and the selected height of the filter media approximate the selected height of the sump pan.

10. The arrangement of claim 9 wherein the opening through the top of the sump pan extends substantially over all of the filter media.

11. The arrangement of claim 10 wherein the device is a transmission.

12. The arrangement of claim 11 wherein the transmission is an automatic transmission.

13. The arrangement of claim 9 wherein the device is an engine and the oil is lubricating oil.

* * * * *